Feb. 15, 1927.  
H. SWANSON  
1,617,877  
CLUTCH MECHANISM  
Filed Dec. 14, 1923  
4 Sheets-Sheet 2

Inventor-
Hjalmar Swanson
By- Munday, Clarke & Carpenter Attys.

Feb. 15, 1927. 1,617,877
H. SWANSON
CLUTCH MECHANISM
Filed Dec. 14, 1923 4 Sheets-Sheet 4

Inventor:
Hjalmar Swanson
By Munday, Clarke & Carpenter
Attys.

Patented Feb. 15, 1927.

1,617,877

UNITED STATES PATENT OFFICE.

HJALMAR SWANSON, OF CHICAGO, ILLINOIS, ASSIGNOR TO CUMMINS PERFORATOR COMPANY, OF CHICAGO, ILLINOIS, A CORPORATION OF ILLINOIS.

CLUTCH MECHANISM.

Application filed December 14, 1923. Serial No. 680,641.

The invention relates to clutch tripping mechanisms and among its many useful applications has particular utility when used in conjunction with perforator machines and has for its objects to provide an intermittent clutch mechanism which may be manually engaged or disengaged and which is at all times efficient and certain in operation; to provide a hand-operated mechanism designed to control a normally disengaged clutch mechanism so that the latter may operate for one revolution with a driving function, mechanism being provided whereby the driving engagement between the driving and driven members is automatically disengaged if desired after one revolution; and to construct the controlling mechanism for the clutch so that complete control of the machine is attained, with a minimum of resistance to manual operation of the controlling mechanism and with an extremely light stroke.

With such objects in view as well as other advantages which may be incident to the use of the improvements, the invention consists in the parts and combinations thereof hereinafter set forth and claimed, with the understanding that the elements constituting the same may be varied in proportions and arrangement without departing from the nature and scope of the invention as hereinafter claimed.

The invention has for other objects such other improvements in construction and advantages in operation as may be found to obtain in the mechanism hereinafter described or claimed.

In the accompanying drawings, forming a part of this application and showing, for purposes of exemplification a preferred form and manner in which the invention may be embodied and practised but without limiting the claimed invention specifically to such illustrative instance or instances:

Fig. 6 is an enlarged detail perspective view of the reciprocating cam element.

Fig. 7 is an enlarged detail perspective view of the collar 27.

Figure 1:
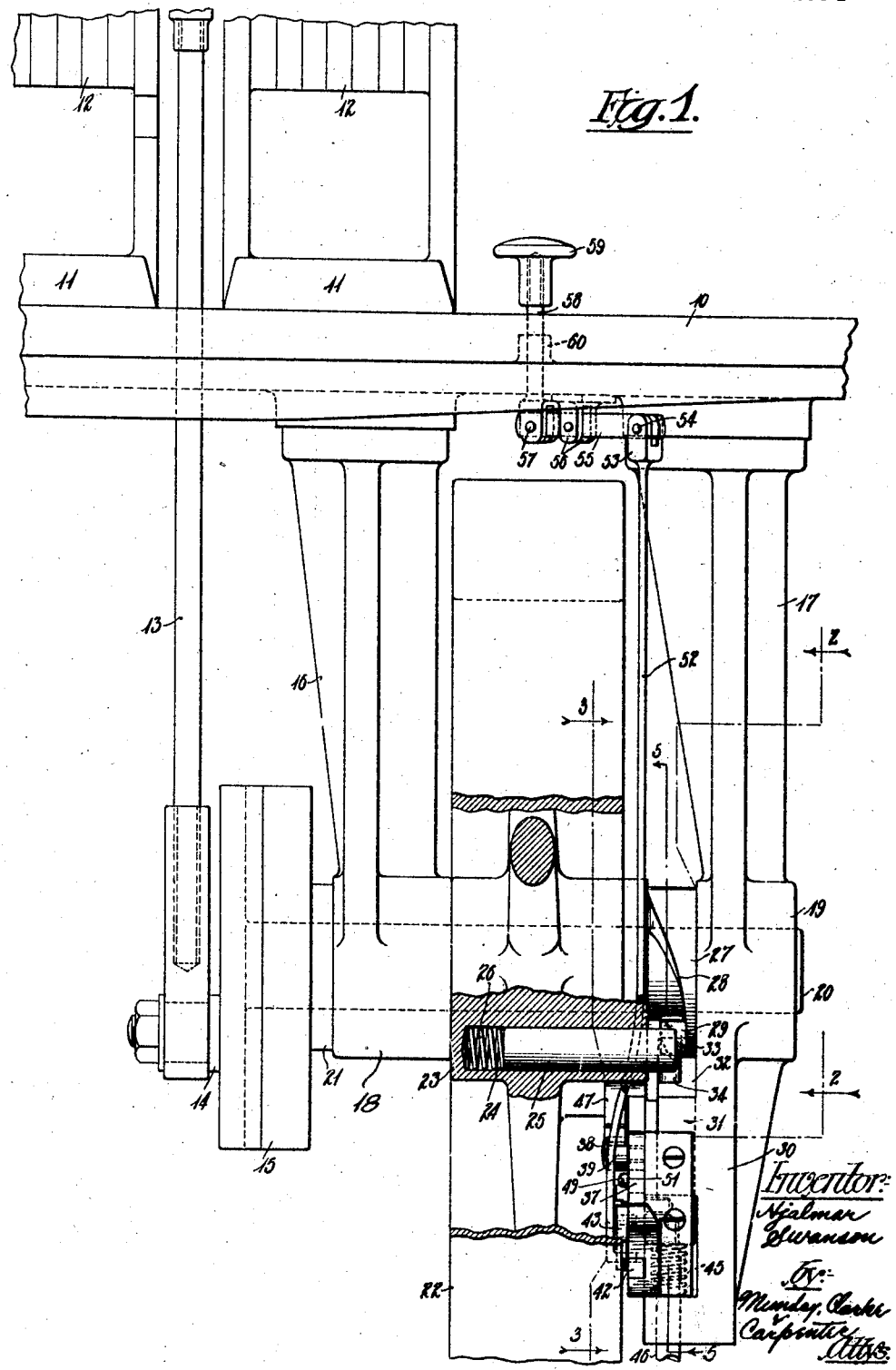
Fig. 1 is a side elevation partially in vertical section showing the preferred embodiment of my invention and a portion of a perforating machine in connection with which the device is designed to be used.

Referring to the drawings, 10 indicates the table portion of the perforating machine having mounted thereon dies 11 designed to operate in conjunction with punches 12, the latter being operated by a pitman 13, crank 14, and eccentric wheel 15 in a manner which will be readily understood.

Suitably secured to the table 10 are a pair of depending hangers 16 and 17 having at their lower portions bearings 18 and 19 forming a journal support for the driven member or shaft 20 to the inner end of which is secured the eccentric driving wheel 15. The latter is suitably spaced from the bearing 18 by a collar 21. Loosely journaled upon the driven shaft 20 is a driving member or fly wheel 22 having an enlarged hub portion 23 in which is disposed a longitudinal recess 24 forming a seat for a driving pin 25. The latter is designed to be continuously forced away from or out of the recess 24 by the coil spring 26. The driven shaft 20 has rigidly secured thereon adjacent the fly wheel 22, a collar 27 having a portion of its periphery shaped to provide a curved cam surface 28 having at its deepest portion an abutment or clutch dog 29. The latter is so disposed as to provide an abutment for the outer end of the pin 25 to effect when desired a driving engagement of the driven member or shaft 20 by the driving member 22. The fly wheel 22 is continuously driven from any suitable source of power not shown in the drawings, and it will be seen that when this driving engagement is in operation, the plungers 12, operate upon any material which it is desired to punch or perforate, on the dies 11, through the medium of the eccentric wheel 15, crank 14 and pitman 13; the upper end of the latter being secured as by a wrist pin to the plungers 12 in any usual or preferred manner.

The lower end of the hanger 17 terminates in a depending portion 30 having guides 31 formed integrally therewith to provide retaining means for a vertically reciprocating trip cam member 32. The upper end of the trip cam member is provided with an arcuate cut-away portion 33 shaped to conform to the circumference of the collar 27 so that the upper end of the trip cam will ride freely against the collar 27 when in its uppermost position within the guides 31.

The upper portion of the trip cam 32 is further provided with an inclined cam surface portion 34 disposed to normally contact against the outer end of driving pin 25 when the cam is in its uppermost position, and the object of the cam surface 34 is to normally engage the end of the driving pin 25 as it travels down the curved cam surface 28 of the collar 27 and trip or shunt it over the clutch dog 29 at each revolution of the fly wheel to prevent a driving connection between the latter and the shaft 20 from being established. This trip engagement of the inclined cam surface with the end of the pin 25 takes place as long as the trip cam 32 is in its normal upper position.

Figure 4:
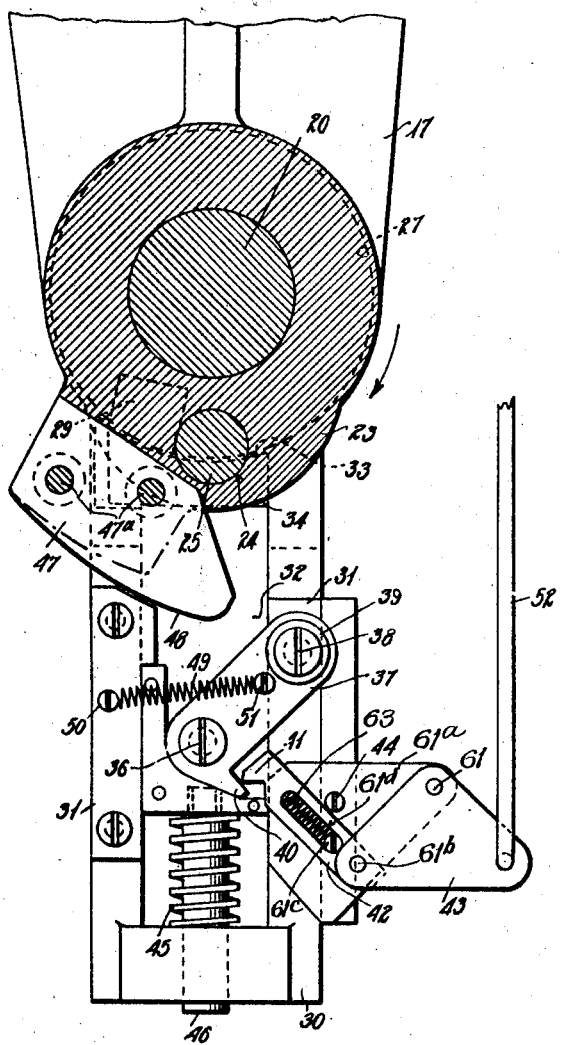
Fig. 4 is a vertical sectional view similar to Fig. 3 but showing the parts in different positions.
Figure 5:
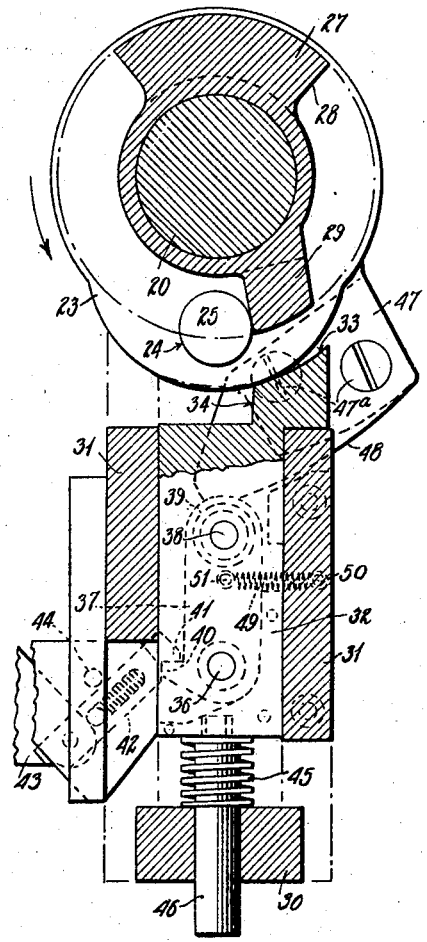
Fig. 5 is a vertical section on line 5—5 of Fig. 1.

Pivotally mounted as at 36 on one side of the cam 32 is a cam controlling member 37 having journaled at its upper portion, by means of a stud 38, a roller 39. The controlling member 37 is further provided at its lower portion with a lug 40 disposed to contact with a similar lug 41 formed in one end of a pivotally and yieldably mounted detent 42 of a trigger lever 43, the latter being pivoted as at 61 to a suitable ear 61$^a$ secured to the depending portion 30 of the hanger 17. The detent 42 is pivotally secured at its lower end as at 61$^b$ to the lever 43 and is further secured to the ear 61$^a$ by means of a screw or pin 61$^c$ passing through an elongated aperture or slot 61$^d$ in said detent (Fig. 4). A compression spring 63 is disposed in said aperture, bearing at one end against the detent 42 and at its lower end against the pin 61$^c$. The spring 63 tends normally to project the detent 42 to the left as viewed in Fig. 4, thereby rocking the trigger lever 43 in a clockwise direction on its pivot 61. The detent 42 is limited in its upward movement with respect to the lug 40 by the pin 44 secured to the fixed ear 61$^a$. The trip cam 32 is normally forced upward and is maintained in the path of the driving pin 25 by the compression spring 45 supported by a stud 46 and housed within the depending portion 30 of the hanger 17.

Figure 2:
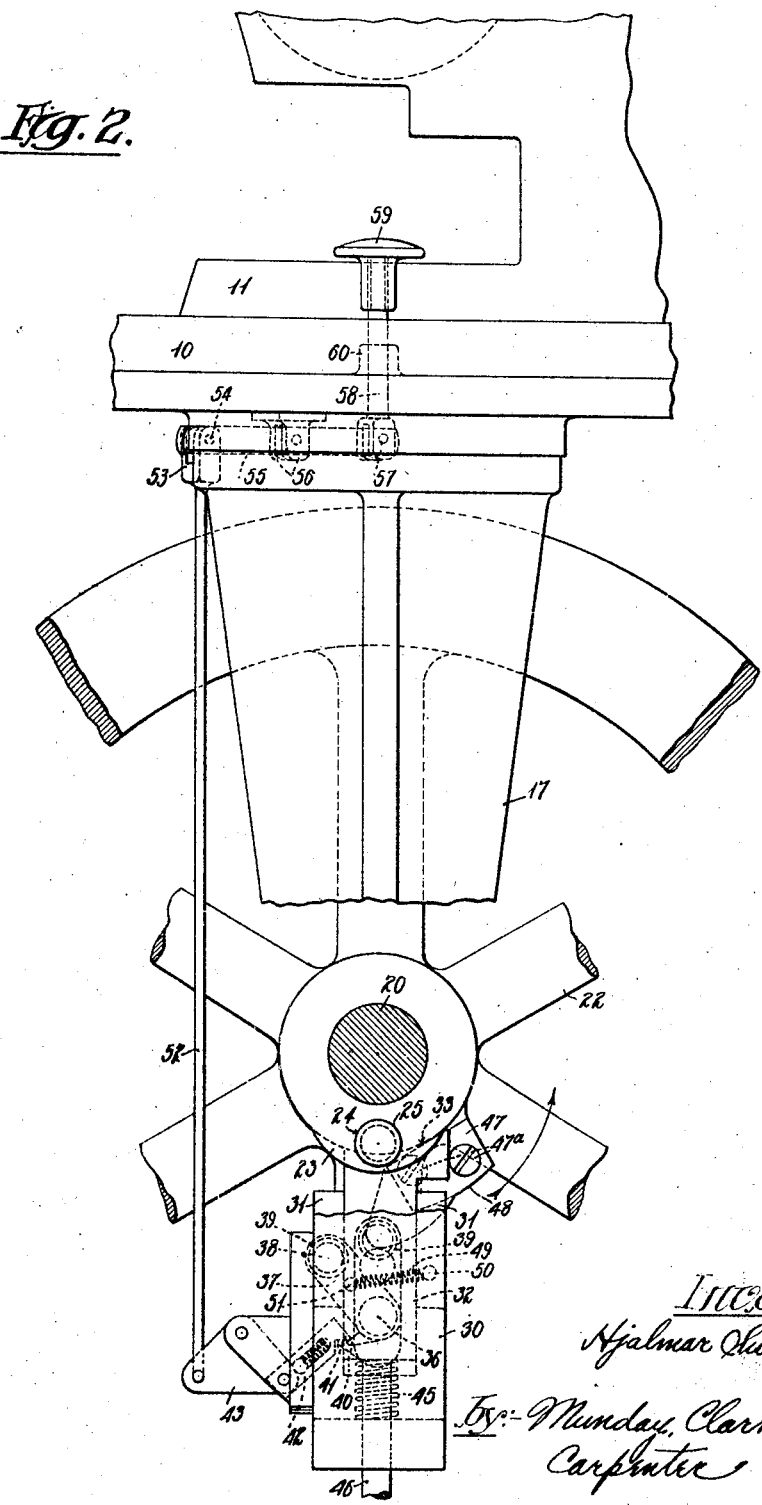
Fig. 2 is an enlarged vertical sectional view on line 2—2 of Fig. 1.
Figure 3:
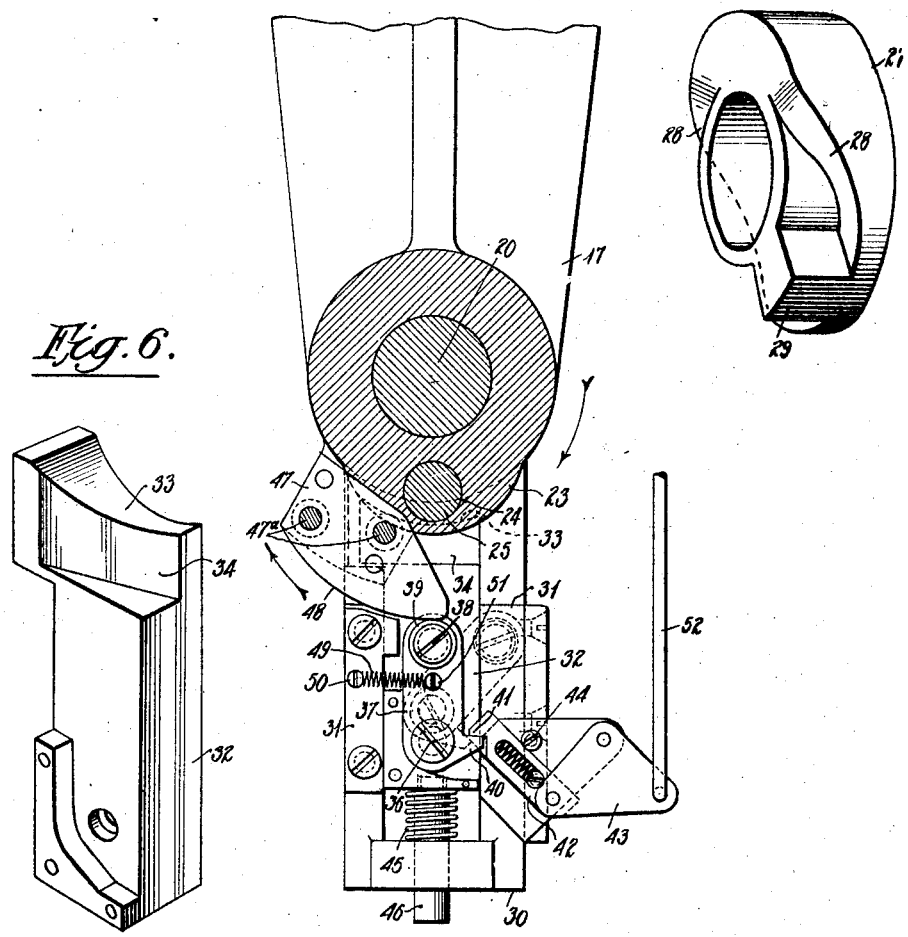
Fig. 3 is a vertical sectional view on line 3—3 of Fig. 1.

The hub portion of the driving member or fly wheel 22 has fixed on the periphery thereof, as by screws or bolts 47$^a$, a revolving cam member 47 rotating with the hub around the axis of the shaft 20 and having a cam surface 48 located in the path of the roller 39. The cam member 47 will be hereafter referred to in the specification and claims as the "revolving cam". The cam surface 48 is designed not to contact with the latter when the roller is normally in the inclined position shown in dotted lines in Fig. 2. The controlling member 37 is normally held in inclined position out of the path of the revolving cam member 47 by means of the engagement of the lug 40 with the detent 42 as above described. A tension spring 49 is provided and secured at 50 to the frame and at 51 to the controlling member 37. The tension of the spring 49 is designed to move the member 37 on its pivot 36 into vertical position with the roller 39 in the path of the revolving cam surface 48 when the trigger mechanism 43 is released.

The outer portion of the trigger lever 43 has secured thereto the lower end of a vertically disposed rod 52 provided at its upper portion with ears 53 pivotally attached, as at 54, to one end of the lever 55 (Fig. 1). The latter is pivoted intermediate its length between ears 56 secured to the lower surface of the table portion 10 and at its other end is pivotally secured, as at 57 between ear portions formed on the lower portion of a plunger 58, the latter having threaded on its upper extremity a hand operated knob or handle 59. A suitable bearing 60 is provided in the table 10 to permit vertical reciprocation of the plunger 58.

From the foregoing description it will be observed that under normal operating conditions the fly wheel 22 is rotating loosely on the driven shaft 20 and driving engagement is prevented by the engagement of the inclined cam surface 34 of the trip cam 32 with the pin 25 at each revolution of the fly wheel with the result that the driving pin 25 is moved inwardly in its recess and shunted over the clutch dog 29. At this time the controlling member 37 carrying the roller 39 is normally held in inclined position out of the path of the revolving cam 47 as it turns around the shaft 20 by the engagement of its lug 40 with the detent 42 of the trigger mechanism. When it is desired to effect a driving engagement between the fly wheel 22 and shaft 20 in order to cause the punches 12 to operate upon material on the dies 11, the knob 59 is manually depressed. This operation results in the rod 52 being lifted, causing the trigger element 43 to be rocked on its pivot 61 and resulting in the detent 41 being withdrawn from engagement with the lug of the controlling member 37. The spring 49 immediately moves the member 37 into vertical position with the roller 39 in the path of the rotating cam 47. At the next revolution of the fly wheel the cam surface 48 engages with the roller 39 and forces the controlling member 37 and trip cam 32 downwardly against the tension of the spring 45 and out of the path of the clutch pin 25. The latter is now free to travel down the inclined cam surface 28 of the collar 27 and engage the clutch dog 29 with a result that the shaft 20 is driven for one revolution and the punches 12 are permitted to operate upon the material resting on the dies 11.

This driving engagement is prevented for more than one revolution for the reason that as soon as the revolving cam 47 passes from its sphere of contact with the roller 39 of the controlling member 37, the latter and the cam 32 is forced upwardly by the spring 45 and the lug 40 of the member 37 engages the lug 41 of the detent, which latter has been again projected by the spring 63 into the path of the lug 40 as soon as pressure is released from the knob 59. This engagement of the lug 40 with the detent again swings the controlling member 37 into inclined position out of the path of the revolving cam 47 and the trip cam 32 being again in its upper position is in a position to again engage the pin 25. The latter on the completion of a single revolution behind the clutch dog 29 is shunted out of engagement with said dog by the cam surface 34 and passes over the dog and again engages the surface of the collar 27 preparatory to riding on the inclined cam surface 28 thereof. A suitable tension device, such as a brake drum (not shown) is provided to act on the shaft 20 carrying the collar 27 to cause the same to come to an immediate stop as soon as the pin 25 has been shunted from engagement with the dog 29 thereby preventing overthrow of the driven shaft and punching elements carried thereby. When the controlling member 37 is being forced upwardly by the spring 45 during one driving revolution of the shaft 20 to engage the lug 40 with the detent 42, the positive engagement of the latter with the lug is insured by the pin 44 on the fixed ear 61ª, which limits the upward movement of the detent. The positive movement of the control element 37 out of the path of the cam 47 against the tension of the spring 49 is thereby effected.

When it is again desired to effect a driving engagement of the fly wheel with the shaft 20 it is necessary to once more depress the knob 59 in order to effect the operation of the various elements as previously described.

In the event that the handle 59 is maintained in depressed position for a prolonged period, the spring 63 is not designed to overcome the pressure of the operator's finger, and consequently does not act to reproject the lug 41 of the detent into the path of the lug 40 of the controlling member 37 after the latter has been depressed by the cam 47. Therefore, after the cam 47 has passed out of contact with the controlling member, the latter is forced upwardly by the tension spring 45 and instead of being swung into inoperative inclined position through the engagement of said lugs as above described, maintains its vertical position to have its roller 39 re-engaged and again projected downwardly by the cam 47 on the succeeding revolution of the driving member or fly wheel 22. This results in a continued intermittent driving engagement being maintained between the clutch members and a corresponding operation of the punches 12 as long as the handle 59 is held in depressed position, and as will be readily apparent.

The invention as hereinbefore set forth is embodied in a particular form of construction but may be variously embodied within the scope of the claims hereinafter made.

What I claim is:

1. A clutch mechanism of the character described, comprising in combination: a driven member, a driving member, a revolving cam carried by said driving member, a yieldably mounted driving pin carried by said driving member and normally maintained out of driving engagement with said driven member, a collar rigidly mounted on said driven member and having a cam surface terminating in an abutment, said abutment being adapted to be engaged by said driving pin, a reciprocable trip cam normally maintained in position to be intermittently engaged by said driving pin, a controlling member pivotally mounted on said reciprocable cam and normally held out of engagement with said revolving cam, means for holding said controlling member out of the sphere of operation of said revolving cam, manual means for actuating said holding means to permit said controlling member to be moved into the sphere of operation of said revolving cam to permit a temporary driving engagement between said driving member and said driven member, and means for elevating said reciprocable cam into the path of said driving pin after said manual means have been actuated to drive said driven member whereby said driving pin is prevented from contacting with said abutment on said collar to drive said driven member.

2. A clutch mechanism of the character described, comprising in combination: a driven member, a driving member, a revolving cam carried by said driving member, driving means carried by said driving member, said driving means being normally maintained out of driving engagement with said driven member, a reciprocating cam normally maintained in position to be engaged by said driving means, a controlling member pivotally and yieldably mounted on said reciprocating cam and normally held out of the sphere of movement of said revolving cam, means for holding said controlling member out of the sphere of movement of said revolving cam, manual means for actuating said holding means to permit the controlling member to be elevated into the sphere of operation of said revolving cam, whereby said reciprocating cam is moved out of the path of said driving means to permit said driving member to engage and drive said driven member after the actuation of said manual means.

3. A clutch mechanism of the character described, comprising in combination: a driven member, a driving member, a revolving cam carried by said driving member, a reciprocating cam normally maintained in position to be engaged by said driving member, a controlling member pivotally and yieldably mounted on said reciprocating cam, said controlling member being normally held out of engagement with said revolving cam, trigger mechanism for holding said controlling member out of the sphere of operation of said revolving cam, manual means for actuating said trigger mechanism to permit said controlling member to be elevated into the sphere of operation of said revolving cam, and resilient means for elevating said reciprocating cam into the path of said driving member to effect the disengagement of said driving member from said driven member after the actuation of said manual means.

4. A clutch tripping mechanism of the character described, comprising in combination: a driven member adapted to operate a reciprocatory perforating mechanism, a driving member, means for clutching said driving member with said driven member for effecting the operation of said perforating mechanism, automatic means normally preventing the engagement of said driving member with said driven member, power-operated means to effect the engagement of said driving member with said driven member, means for holding said power-operated means inoperative and manually-controlled means for temporarily disabling said holding means.

5. A clutch mechanism of the character described, comprising in combination: a driven member adapted to operate a reciprocatory perforating mechanism, a driving member, a revolving cam carried by said driving member, driving means carried by said driving member, said driving means being normally held out of engagement with said driven member, a reciprocating cam normally maintained in position to be intermittently engaged by said driving means, a controlling member pivotally mounted on said reciprocating cam and normally held out of engagement with said revolving cam, trigger mechanism normally engaging said controlling member, and means for operating said trigger mechanism to release said controlling member whereby said reciprocating cam is moved out of the path of said driving means to permit said driving means to engage and drive said driven member.

6. A clutch mechanism of the character described comprising, in combination: a driving member, a driven member adapted to operate a reciprocatory perforating mechanism and adapted to be rotated by said driving member, a clutch pin carried by said driving member, said pin being longitudinally movable into and out of engagement with said driven member to drive the same, means for projecting said pin, a sliding cam adapted to be moved into and out of the sphere of rotation of said pin and having means for retracting the pin when in the former position, means normally maintaining said cam within the sphere of rotation of said clutch pin, a revolving cam rotating with said driving member, a controlling member pivoted on said sliding cam and movable into and out of the path of said revolving cam, a spring operating on said controlling member, manually operable means for permitting said controlling member to swing into position to be engaged by said revolving cam, and automatic means for moving said controlling member out of the path of said revolving cam after such engagement.

7. A clutch mechanism of the character described, comprising in combination: a driven member, a driving member, a revolving cam carried by said driving member, driving means carried by said driving member and normally held out of driving engagement with said driven member, a trip cam for normally holding said driving means out of said driving engagement, revolving cam-engaging means carried by said trip cam and normally held out of the path of said revolving cam, means for normally holding said revolving cam-engaging means out of the path of said revolving cam and adapted to be actuated to permit the movement of said cam-engaging means into the path of said revolving cam, and means for moving said cam-engaging means into the sphere of operation of said revolving cam after the actuation of said holding means whereby said trip cam is moved out of the path of said driving means to effect a driving engagement of said driving member with said driven member.

8. A clutch mechanism of the character described, comprising in combination: a driven member, a driving member, a revolving cam carried by said driving member, driving means carried by said driving member and adapted to be normally held out of driving engagement with said driven member, a trip cam for normally holding said driving means out of said driving engagement, a control element carried by said trip cam, cooperating means for normally holding said control element out of the sphere of operation of said revolving cam, means for actuating said holding means to permit the movement of said control element into the path of said revolving cam to be engaged thereby, whereby said trip cam is moved out of the path of said driving means to permit a temporary driving engagement of said driving member with said driven member, and cooperating means for automatically returning said control element to its normal position out of the path of said revolving cam during said temporary driving connection, said latter mentioned cooperating means serving also to return said trip cam to its normal position in the path of said driving means, to effect the disengagement of the temporary driving connection between said driving member and said driven member.

9. A clutch mechanism of the character described, comprising in combination: a driven member, a driving member, a revolving cam carried by said driving member, driving means carried by said driving member, a trip cam for normally holding said driving means out of driving engagement, a control element carried by said trip cam, means for normally holding said control element out of the sphere of operation of said revolving cam, manually operated means for actuating said holding means to permit the movement of said control element into the path of said revolving cam to be engaged thereby, whereby said trip cam is moved out of the path of said driving means to permit a temporary driving engagement of said driving member with said driven member, and means for automatically returning said control element to its normal position out of the path of said revolving cam during said temporary driving connection, said latter mentioned means serving also to return said trip cam to its normal position in the path of said driving means, to effect the disengagement of the temporary driving connection between said driving member and said driven member.

10. In a clutch mechanism, in combination: a driven member, a driving member, driving means carried by said driving member and adapted to be normally held out of driving engagement with said driven member, automatic means for normally preventing said driving engagement, control means normally disposed out of the path of said driving member and adapted to be moved into the path of said driving member to operate said automatic means and permit a driving engagement between said driven member and said driving means; means for holding said control means out of the path of said driving member; manually actuated means for releasing said control means from said holding means; said automatic means cooperating with said holding means, after the manually actuated means has returned to normal position, to move said control means out of the path of said driving member.

11. A clutch mechanism comprising a driven member, a driving member, means normally interposed in the path of said driving member to prevent its driving engagement with said driven member, and controlling means for said interposed means normally disposed out of the path of said driving member and adapted to be moved into the path of said driving member to project said interposed means out of the path of said driving member, whereby an intermittent driving engagement between said driven and driving members is effected.

12. A clutch mechanism comprising a driven member, a driving member, means normally interposed in the path of said driving member to prevent its driving engagement with said driven member, controlling means for said interposed means normally disposed out of the path of said driving member and adapted to be moved into the path of said driving member to project said interposed means out of the path of said driving member, and manually actuated means for permitting said controlling means to be moved into the path of said driving member, whereby an intermittent driving engagement between said driven and driving members is effected.

13. A clutch mechanism comprising a driven member, a driving member, means normally interposed in the path of said driving member to prevent its driving engagement with said driven member, controlling means for said interposed means normally disposed out of the path of said driving member and adapted to be moved into the path of said driving member to project said interposed means out of the path of said driving member, and manually actuated means for permitting said controlling means to be moved into the path of said driving member, to establish a driving engagement between said driven and driving members, said manually actuated means being further automatically operable to re-project said controlling means out of the path of said driving member, whereby said driving engagement is discontinued.

14. A clutch mechanism comprising a driven member, a driving member loosely mounted thereon and normally tending to effect a driving engagement therewith, a spring pressed cam member normally interposed in the path of said driving member to normally prevent its driving engagement with said driven member, a controlling member carried by said interposed cam member and normally disposed out of the path of said driving member, and spring means adapted to move said controlling member into the path of said driving member to project said cam member out of the path of said driving member, whereby an intermittent driving engagement between said driven and driving members is effected.

15. A clutch mechanism comprising a driven member, a driving member loosely mounted thereon and normally tending to effect a driving engagement therewith, a spring pressed cam member normally interposed in the path of said driving member to normally prevent its driving engagement with said driven member, a controlling member carried by said interposed cam member and normally disposed out of the path of said driving member, spring means adapted to move said controlling member into the path of said driving member to project said cam member out of the path of said driving member, and manually actuated means for permitting said controlling member to be moved into the path of said driving member, whereby an intermittent driving engagement between said driven and driving members is effected.

16. A clutch mechanism comprising a driven member, a driving member loosely mounted thereon and normally tending to effect a driving engagement therewith, a spring pressed cam member normally interposed in the path of said driving member to normally prevent its driving engagement with said driven member, a controlling member carried by said interposed cam member and normally disposed out of the path of said driving member, spring means adapted to move said controlling member into the path of said driving member to project said cam member out of the path of said driving member, and manually actuated means for permitting said controlling member to be moved into the path of said driving member, to establish a driving engagement between said driven and driving members, said manually actuated means being further and automatically operable to re-project said controlling member out of the path of said driving member, whereby said driving engagement is discontinued.

17. In a clutch mechanism, in combination: a vertically slidable member; a driving member therefor, pivotally mounted thereon; spring means tending to draw said driving member about its pivot towards said vertically slidable member; a releasable holding member engaging said driving member adjacent its pivot; said holding member co-operating with said vertically slidable member to swing said driving member on its pivot and against the action of its spring, away from said vertically slidable member.

In testimony whereof I have hereunto set my hand.

HJALMAR SWANSON.